United States Patent [19]

Abbott

[11] 4,385,489
[45] May 31, 1983

[54] FUEL SYSTEMS FOR GAS GENERATORS

[75] Inventor: Adrian Abbott, Reading, England

[73] Assignee: British Aerospace Public Limited Company, London, England

[21] Appl. No.: 275,465

[22] Filed: Jun. 19, 1981

Related U.S. Application Data

[63] Continuation of Ser. No. 53,605, Jun. 29, 1979.

[30] Foreign Application Priority Data

Jul. 13, 1978 [GB] United Kingdom ............... 29746/78

[51] Int. Cl.³ .............................................. F02C 7/22
[52] U.S. Cl. .................................. 60/39.06; 60/39.48; 60/39.8
[58] Field of Search ................... 60/39.48, 39.8, 39.76, 60/247, 39.06, 259

[56] References Cited

U.S. PATENT DOCUMENTS

| | | | |
|---|---|---|---|
| 2,683,963 | 7/1954 | Chandler | 60/259 |
| 2,986,004 | 5/1961 | McKenney | 60/39.48 |
| 3,024,597 | 3/1962 | Beck et al. | 60/247 |
| 3,052,094 | 9/1962 | Osburn | 60/247 |
| 3,098,353 | 7/1963 | Abild | 60/259 |
| 3,120,738 | 2/1964 | Webb | 60/259 |
| 3,231,002 | 1/1966 | Lehrer | 60/39.48 |
| 3,525,217 | 8/1970 | DeMattia et al. | 60/39.48 |
| 3,722,217 | 3/1973 | Reynolds et al. | 60/39.48 |

*Primary Examiner*—Louis J. Casaregola
*Attorney, Agent, or Firm*—Cushman, Darby & Cushman

[57] ABSTRACT

The invention provides a fuel supply system for a gas generator having a minimum of moving-part components and avoids highly-pressurized containers. The system comprises a pressurizable fuel reservoir (1) connected to both the inlet and outlet of a combustion chamber via flow control means (1,16) the arrangement being such that fuel flows to the combustion chamber and other areas of use when pressure in the fuel reservoir (1) is greater than that in the combustion chamber and gas flows to the fuel reservoir (1) to pressurize the latter when the pressure therein is less than that of the combustion chamber, the respective flow control means (11,16) operating in sequence such that the system operates in a cyclical and self-generating manner. The invention is particularly applicable to gas generators forming part of rocket motors.

3 Claims, 5 Drawing Figures

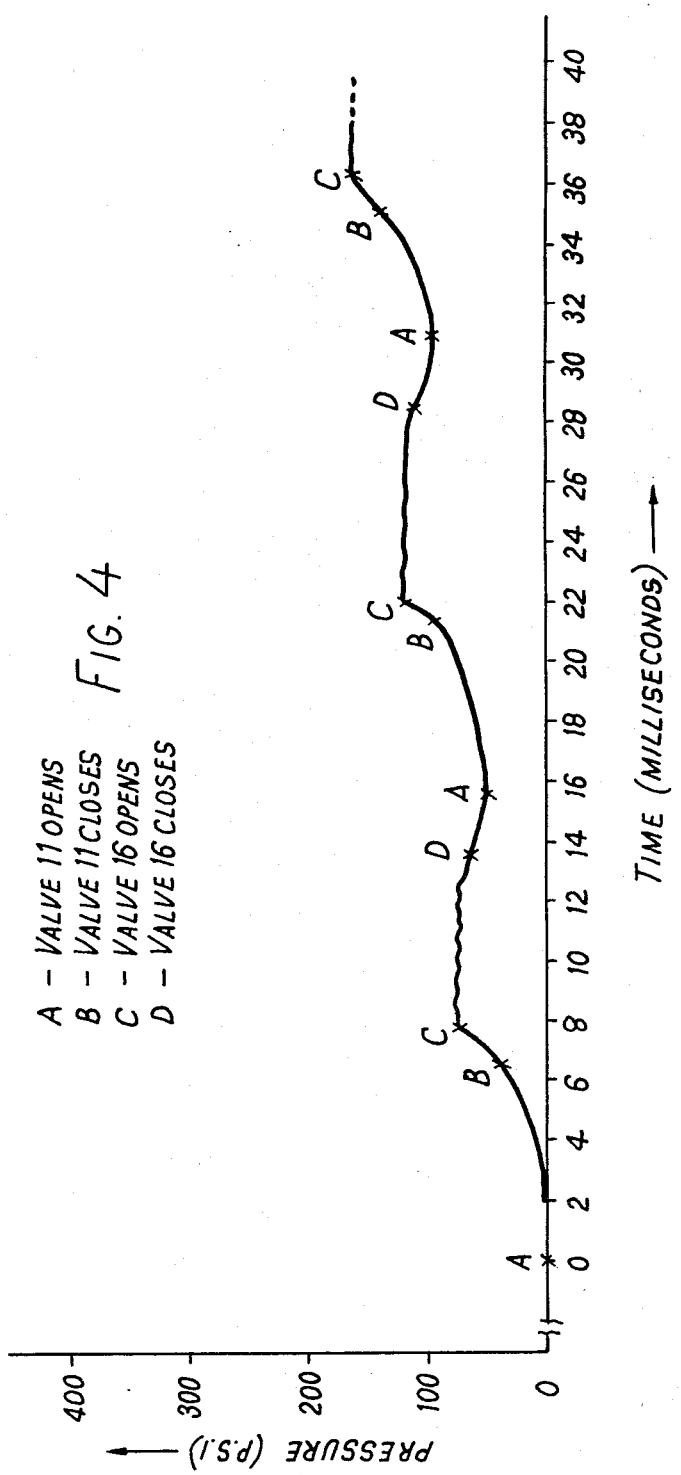

FUEL SYSTEMS FOR GAS GENERATORS

This application is a continuation of application Ser. No. 53,605, filed June 29, 1979.

BACKGROUND OF THE INVENTION

1. Field of the Invention

This invention relates generally to gas generators such as are used, for example, in the propulsion and/or guidance of guided missiles. More specifically, the invention relates to a fuel supply system for a gas generator.

2. Description of the Prior Art

A gas generator normally comprises a combustion chamber and a fuel reservoir, fuel being supplied to the combustion chamber and burned therein to produce a hot gas which is supplied to a load such as an outlet choke. The fuel may be a monopropellant or a bipropellant but in each case it has to be supplied to the combustion chamber, normally under pressure, and there are in existence a number of different fuel supply or pressurisation systems. The fuel reservoir may be pressurized using a gas bottle controlled by valve means or using a solid charge igniter, such as cordite breech igniter, connected to the fuel reservoir by pressure control means and having some form of igniter associated therewith, the charge producing a pressurised gas which in turn pressurises the fuel reservoir.

An alternative known fuel supply system relies on a pump to transfer fuel from the reservoir to the combustion chamber and the pump may be energised from a power supply (local or remote) or by a turbine driven by an auxiliary gas generator. A further alternative system is of the so-called bootstrap type in which gas generated in the combustion chamber is used to pressurise the fuel reservoir through pressure-amplifying means, such as a differential piston. All of these known fuel pressurising/supply systems suffer from either or both of the disadvantages of increasing the mass of the gas generator and involving moving parts which are particularly serious in the context of guided missiles because space is always at a premium and components having moving parts give rise to problems of reliability.

One of the most convenient fuel-pressurisation systems is that employing a gas bottle as described above but apart from possessing the disadvantage of occupying a relatively large space, the gas bottle gives rise to grave handling problems. For a typical gas generator, the pressure required to be stored in the gas bottle is of the order of 6000 p.s.i. and any container pressurised to this level is potentially dangerous and the safety procedure for handling can be onerous.

The sequence of events in a combustion chamber can be summarised as follows:
  fuel injection
  fuel atomisation
  fuel vapourisation
  chemical reaction producing hot gasses.

The time taken for the chemical reaction to take place following the fuel injection varies with the type of fuel used and the conditions but is often of the order of several milliseconds. In the steady state condition, the process is continuous but in the presence of perturbations, oscillations in the pressure of the generated gas can occur and are classified as follows:

Chugging—a low frequency oscillation in the range 20 to 200 Hz due to pressure interactions between the fuel and combustion chamber.

Buzzing—usually due to vibration of the gas generator in the range of 200 to 2000 Hz.

Screaming—this occurs at a frequency above 1000 Hz and is due to combustion pressure waves and can be destructive.

It will be appreciated that due to the process time delay between fuel injection and chemical reaction, it is possible to generate pressures in the combustion chamber which are higher than the fuel injection pressure. To date, this phenomenon has been considered undesirable bu the present invention turns on the concept of generating these higher pressures in the combustion chamber and harnessing them for fuel pressurisation.

SUMMARY OF THE INVENTION

According to the present invention a fuel pressurisation system for a gas generator comprises a pressurisable fuel reservoir having a first outlet connectible to the gas generator, and a second output, a combustion chamber having an inlet to which the second outlet of the fuel reservoir is connected, a first outlet for the generated gas and a second outlet connected to the fuel reservoir, and means for effecting initial pressurisation of the fuel reservoir to supply fuel to the combustion chamber, thereafter the fuel reservoir being pressurised by the gas generated in the combustion chamber via the connection therebetween, the connection between the second outlet of the fuel reservoir and the inlet of the combustion chamber being provided with fuel flow control means operable to permit flow of fuel from the reservoir to the combustion chamber when the pressure in the former is greater than that in the latter, and to arrest that flow of fuel when the pressure in the combustion chamber is higher than that in the fuel reservoir, and the connection between the second output of the combustion chamber and the fuel tank being provided with gas flow control means operable to permit flow of gas from the combustion chamber to the fuel reservoir when the pressure in the former is greater than that in the latter and to arrest that flow of gas when the pressure in the fuel tank is greater than that in the combustion chamber, the fuel flow control means being arranged to operate at an absolute pressure lower than the absolute operating pressure of the gas flow control means, whereby the supply of fuel to the combustion chamber is cyclical and self-generating.

As a result of using the gas generated in the combustion chamber to pressurise the fuel reservoir directly, the use of components having moving parts is minimised as is the mass of the gas generator.

The means for effecting initial pressurisation of the fuel reservoir may comprise a separate, relatively low pressure source connected to the fuel reservoir, or the fuel reservoir itself may have a relatively low pressure stored therein. Alternatively, a solid charge igniter may be provided to generate gas under pressure which can be fed either directly to the fuel reservoir or indirectly via the combustion chamber. The use of low-pressure pressurisation means obviates the use of a high-pressure gas bottle with attendant advantages.

The fuel may be a catalyst-decomposable or a thermal-decomposable monopropellant, in which case the fuel reservoir may comprise a single tank. Alternatively, a bi-propellant fuel may be employed, in which case two fuel tanks are used. Irrespective of the type of fuel employed, the or each fuel tank may have a diaphragm or foraminous screen separating liquid fuel from the remainder of the tank to which is applied the fuel-pressurising medium.

The fuel flow and gas flow control means may each be in the form of a non-return valve and a pressure control means, such as a valve, may also be provided in the connection between the output of the fuel reservoir and the input of the combustion chamber, together with an ON/OFF valve. The pressure control means are operable to sense, directly or indirectly, the pressure in the combustion chamber and interrupt, or maintain interrupted, the flow of fuel thereto in the event of the pressure exceeding a predetermined amount.

BRIEF DESCRIPTION OF THE DRAWINGS

Fuel pressurisation systems for gas generators in accordance with the present invention will now be described in greater detail, by way of example, with reference to the accompanying drawings in which:

FIGS. 4 and 5 are explanatory graphs.

DESCRIPTION OF THE PREFERRED EMBODIMENT

Figure 1:
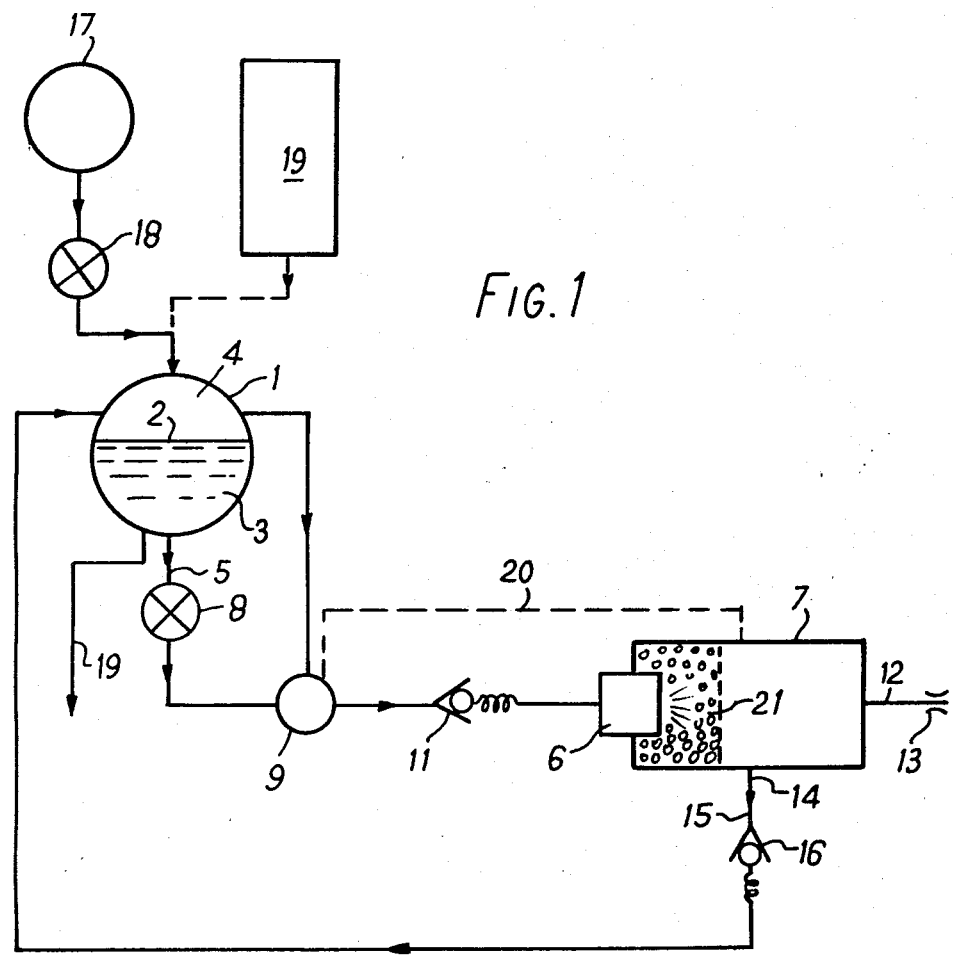
FIG. 1 is a diagrammatic representation of a first fuel pressurisation system in accordance with the invention.

Referring to FIG. 1, the fuel pressurisation system illustrated therein comprises a pressurisable fuel tank 1 having a diaphragm or foraminous screen 2 separating fuel 3 from the remainder of the tank interior 4. An outlet pipe 5 connects the tank 1 to an injector 6 of a combustion chamber 7 via an ON/OFF valve 8, a pressure control valve 9 (which is optional) and a non-return valve 11. The pressure control valve 9 is also connected to the tank interior 4. The combustion chamber 7 has a first outlet 12 containing a choke 13 from which generated gas is fed to a load (not shown) or dumped. The combustion chamber 7 also has a second outlet 14 which is connected to the tank interior 4 by a pipe 15 via a non-return valve 16.

Means are provided for effecting initial pressurisation of the fuel 3 in the tank 1, these means comprising a separate source 17 of pressure, such as a low-pressure gas bottle, connected to the tank interior 4 by an ON/OFF valve 18. FIG. 1 shows an alternative fuel-pressurisation means in the form of a solid charge igniter 19 which, when activated, generates gas under pressure which is fed to the tank interior 4.

The fuel tank 1 has another outlet pipe 19 though fuel is supplied to gas generator (not shown) with which the fuel pressurisation system is to be used. The illustrated system is designed for a catalyst-decomposable monopropellant fuel, such as hydrazine, a catalyst 21 being contained in the combustion chamber 7.

When operation of the gas generator is required, the fuel pressurisation system is initiated by opening valve 8 and then opening the valve 18 or energising the solid charge 19. In either case, the fuel 3 in the tank 1 is pressurised to a pressure higher than that pertaining in the combustion chamber 7, whereupon fuel flows from the tank to the combustion chamber. More specifically, the fuel enters the combustion chamber 7 through the injector 6 and is first atomised and then vapourised.

Finally, combustion of the fuel takes place as a result of catalyst-decomposition and hot gas is generated within the combustion chamber 7, whereby the pressure in the latter increases. Due to combustion delay, it is possible to inject into the combustion chamber 7 sufficient fuel for a reservoir thereof to have collected such that when combustion takes place, a pressure much higher than that at which the fuel was injected may be attained. When the pressure in the combustion chamber 7 is greater than that in the fuel tank 1, first the non-return valve 11 closes, thereby arresting the flow of fuel to the combustion chamber, and subsequently the non-return valve 16 is arranged to open so that the fuel tank pressure begins to rise as a result of the flow thereto, through the pipe 15, of the hot gas generated in the combustion chamber. At the same time, generated gas is being supplied to the load, or dumped, through the first outlet 12 which means that, with the fuel flow arrested, the pressure in the combustion chamber will decay. Thus a point will be reached when the pressure in the combustion chamber 7 falls below that in the fuel tank 1, whereupon first the non-return valve 16 will close and then the non-return valve 11 will open, resulting in fuel again being supplied to the combustion chamber and the above-described cycle of operation being repeated.

The graph of FIG. 4 illustrates the cycle of operation, starting with the initiation of the fuel supply system, combustion chamber pressure being plotted against time. It is assumed that the initial fuel tank pressure using the pressure source 17 or the igniter 19 is 50 p.s.i. and the points A, B, C and D on the graph indicate the following:

| A - valve 11 opens | B - valve 11 closes |
|---|---|
| C - valve 16 opens | D - valve 16 closes |

The graph shows a delay of some 2 milliseconds between the initial opening of valve 11 (point A) and a rise in pressure of the combustion chamber 7, the delay arising from the flow of fuel to the combustion chamber and the ignition thereof. The combustion chamber pressure then continues to rise (for about 6 milliseconds) and when it exceeds that in the fuel tank 1, the valve 11 closes (point B), the pressure increase continuing until valve 16 opens (point C) and generated gas is fed to the fuel tank to pressurise same. At this point, the combustion chamber pressure levels off (6 milliseconds) and eventually decays (2 milliseconds) as the available fuel is exhausted (bearing in mind the fuel supply valve 11 is still closed). Upon decay of the combustion chamber pressure, valve 16 closes (point D) and upon further decay, valve 11 opens (point A) and the cycle is repeated, each cycle resulting in a successive increase in combustion chamber pressure until the steady state condition is reached which is illustrated by the graph of FIG. 5, a nominal fuel tank pressure of 750 p.s.i. being assumed. The points A, B, C and D on the graph of FIG. 5 represent the same valve openings and closures as explained in connection with the graph of FIG. 4. It will be seen that the cycle time is 14 milliseconds and this gives a repetition frequency of about 70 Hz.

It will be seen that once the gas generator has been rendered operative, it is self-supporting in that fuel is supplied to the combustion chamber in a cyclical manner by the very operation of the combustion chamber. There are no components with moving parts involved in the supply of fuel save for standard valves, which are generally reliable, and since only initial pressurisation of the fuel reservoir is required, the means employed to this end are smaller than would otherwise be required so reducing the overall size and mass of the gas generator for a given capacity. Also, if the initial pressurisation of the fuel reservoir involves a gas bottle, the pressure therein is relatively low (typically 100-1000 p.s.i.) so that no safety problems arise.

In as much as the supply of fuel to the combustion chamber 7 and the combustion of fuel therein is time-dependent, it can be arranged for an appropriate mass or slug of fuel to be injected into the combustion chamber 7 at each cycle of fuel supply to ensure a relatively rapid pressure increase in the combustion chamber, such as would normally be avoided, in order to effect the desired self-pressurisation of the fuel reservoir. Also, it is a simple matter to control the cycle of operation of the fuel supply system by selecting the appropriate operational characteristics for the valves 11 and 16.

Typical parameters of a system in accordance with the invention might be:

| | |
|---|---|
| Initial pressurisation of fuel tank: | 100-1 p.s.i. |
| Normal running pressure of fuel tank: | 100-10,000 p.s.i. |
| Proportion of fuel flow from tank 1 to feed combustion chamber 7: | 1-10% |

Of the gas generated in the combustion 7 of the embodiment of FIG. 1, it has been calculated that about 60% is used to pressurise the fuel tank 1 with the remainder issuing from the choke 13.

The pressure control valve 9 is a safety device and operates to interrupt flow of fuel to the combustion chamber 7 in the event of the pressure in the fuel tank exceeding a predetermined value. Instead of the pressure-control valve 9 being controlled by the pressure in the fuel tank 1, it may be controlled pneumatically, hydraulically, mechanically or electrically by the pressure in the combustion chamber 7 as indicated by the broken line connection 20 therebetween in FIG. 1, the valve being rendered operative when the combustion chamber pressure exceeds a predetermined value.

Figure 2:
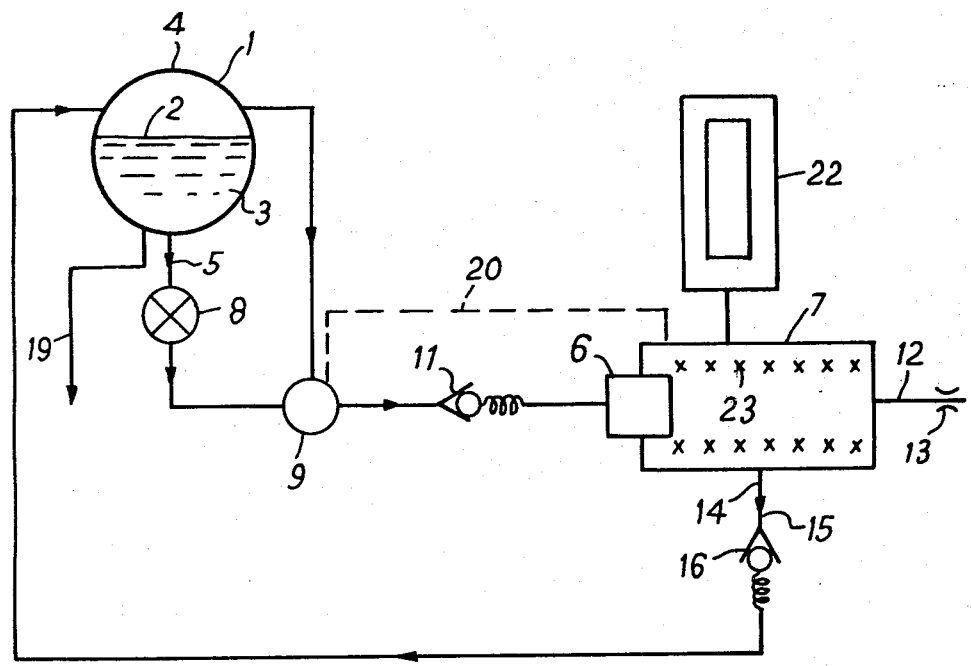
FIG. 2 is a diagrammatic representation of a second system in accordance with the invention.

FIG. 2 illustrates an alternative fuel pressurisation system which is generally similar to that of FIG. 1 but designed for a thermal-decomposable monopropellant fuel such as isopropyl nitrate (IPN). The main differences between the FIG. 1 and FIG. 2 embodiments are that the components 17 and 18 (or 19) are replaced by a solid propellant igniter 22 connected to the combustion chamber 7, and the catalyst 21 in the combustion chamber is replaced by a heat sink grid 23. On start-up, the igniter 22 is actuated, whereupon hot gas is injected into the combustion chamber 7 causing both an increase in pressure within the combustion chamber and an increase in temperature of the grid 23. The pressure increase results in the opening of the valve 16 so that the fuel tank 1 is pressurised and fuel will flow to the combustion chamber 7 once the pressure in the latter has decayed, due to exhaustion of the igniter 22, to a value lower than that in the tank so as to open valve 11 following the closure of valve 16. The fuel then decomposes on contact with the hot combustion chamber and heat sink grid 23 to produce hot gas and hence initiate the next cycle of fuel pressurisation and supply in the manner already described with reference to FIG. 1.

Figure 3:
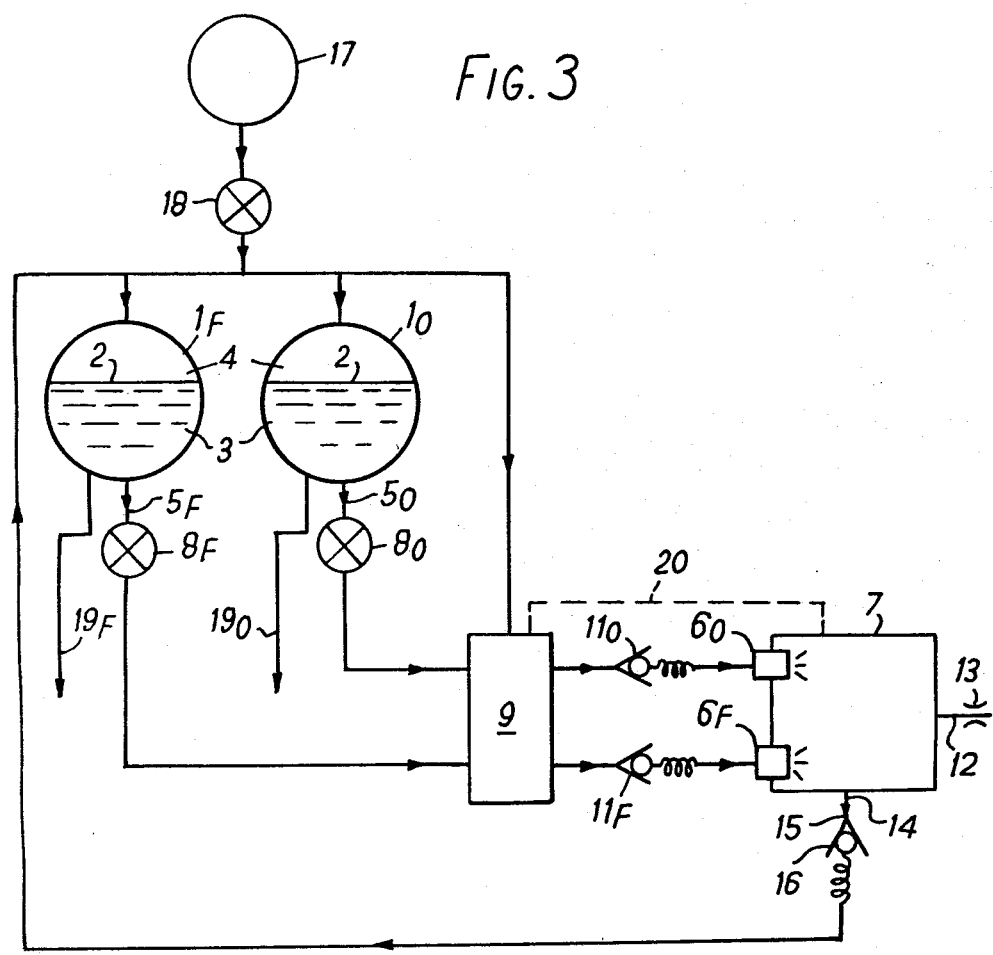
FIG. 3 is a diagrammatic representation of a third system in accordance with the present invention.

The embodiment illustrated in FIG. 3 is for a bipropellant fuel and is generally similar to the embodiments of FIGS. 1 and 2 except that two tanks $1_F$ and $1_o$ are employed to hold the fuel and oxidant, respectively, together with respective ON/OFF valves $8_o$ and $8_F$, non-return valves $11_o$ and $11_F$ and injectors $6_o$ and $6_F$. A pressure control valve 9 common to both fuel tanks $1_o$ and $1_F$ is employed and the non-return valves $11_o$ and $11_F$ may be coupled together to ensure simultaneous injection of fuel and oxidant into the combustion chamber 7. The means for inital pressurisation of the fuel tanks $1_o$ and $1_F$ are shown as the gas bottle 17 and valve 18 of FIG. 1 but may be other means such as the igniter 19 of FIG. 1 or the igniter 22 of FIG. 2. Once initial pressurisation of the fuel tanks $1_o$ and $1_F$ has been effected, fuel and oxidant are injected into the combustion chamber 7 and provided they are a hypergolic pair, decomposition will take place and hot gas produced as a result and the cyclical pressurisation of the fuel tanks initiated in a manner similar to that already described with references to FIG. 1.

It will be appreciated that the supply of fuel utilising the present invention is effected in a pulsatory manner which means that the utilisation means has to be compatible with this. It will also be appreciated that the components of the described embodiments are conventional and do not include problematical items such as pumps or gas bottles pressurised to a high value which can give rise to handling and operational difficulties.

I claim:

1. A method of supplying a monopropellant or bi-propellant fuel from a fuel reservoir to a gas generator, the fuel reservoir being connected to both an inlet and an outlet of a combustion chamber via flow control means, the method comprising the steps of:

effecting initial pressurization of the fuel reservoir to permit fuel to flow to the gas generator and to the combustion chamber, and arranging for the quantity of fuel supplied to the combustion chamber to be such as to pressurize the combustion chamber to a higher pressure, below a predetermined maximum, than the pressure of the incoming fuel;

closing the fuel control means disposed between the fuel reservoir and the inlet of the combustion chamber so as to arrest the flow of fuel to the combustion chamber, and subsequently opening the flow control means disposed between the fuel reservoir and the outlet of the combustion chamber, whereby the pressure in the fuel reservoir rises until the pressure in the combustion chamber decays due to the exhaustion of the fuel previously supplied thereto;

closing the flow control means disposed between the fuel reservoir and the outlet of the combustion chamber when the pressure in the latter falls below that in the fuel reservoir, and subsequently opening the flow control means disposed between the fuel reservoir and the inlet of the combustion chamber so that fuel flow to the combustion chamber is resumed; and rearranging for the quantity of fuel supplied to the combustion chamber to be such as to pressurize the combustion chamber to a higher pressure, below the predetermined maximum, than the pressure of the incoming fuel, such that the alternately permitted and arrested fuel flow to the combustion chamber is cyclical and self-generating.

2. A method according to claim 1 further comprising the steps of sensing the pressure in the combustion chamber and controlling the flow of fuel to the combustion chamber when the pressure in the combustion chamber reaches a predetermined value.

3. A method according to claim 2 wherein the step of sensing the pressure in the combustion chamber is performed via the fuel reservoir.

* * * * *